United States Patent [19]
Klauer

[11] Patent Number: 6,039,381
[45] Date of Patent: Mar. 21, 2000

[54] CLIP-ON SIDE SUN VISOR

[76] Inventor: Andrew W. Klauer, 1104 Mistletoe La., Winneconne, Wis. 54986

[21] Appl. No.: 09/395,857

[22] Filed: Sep. 14, 1999

[51] Int. Cl.$^7$ ........................................................ B60J 3/00

[52] U.S. Cl. ............................................................ 296/97.6

[58] Field of Search ................................... 296/97.6, 97.9

[56] References Cited

U.S. PATENT DOCUMENTS

| | | | |
|---|---|---|---|
| 4,913,483 | 4/1990 | Jasso | 296/97.6 |
| 5,306,065 | 4/1994 | Ades | 296/97.6 |
| 5,356,192 | 10/1994 | Schierau | 296/97.6 |
| 5,611,591 | 3/1997 | Van Devender | 296/97.6 |

FOREIGN PATENT DOCUMENTS

| | | | |
|---|---|---|---|
| 2688743 | 9/1993 | France | 296/97.6 |

*Primary Examiner*—Joseph D. Pape
*Attorney, Agent, or Firm*—Donald J. Ersler

[57] ABSTRACT

A clip-on side sun visor includes an attachment device, a support rod, and a side sun visor. A first end of the attachment device is pivotally attached to one end of the support rod. A downward facing clip is disposed at the first end of the attachment device. An upward facing clip is disposed at a second end of the attachment device. The first end of the attachment device is disposed at a top of the front sun visor and the second end of the attachment device is disposed at a bottom of the front sun visor. device. The side sun visor is slid over the support rod and preferably pivots relative thereto.

14 Claims, 3 Drawing Sheets

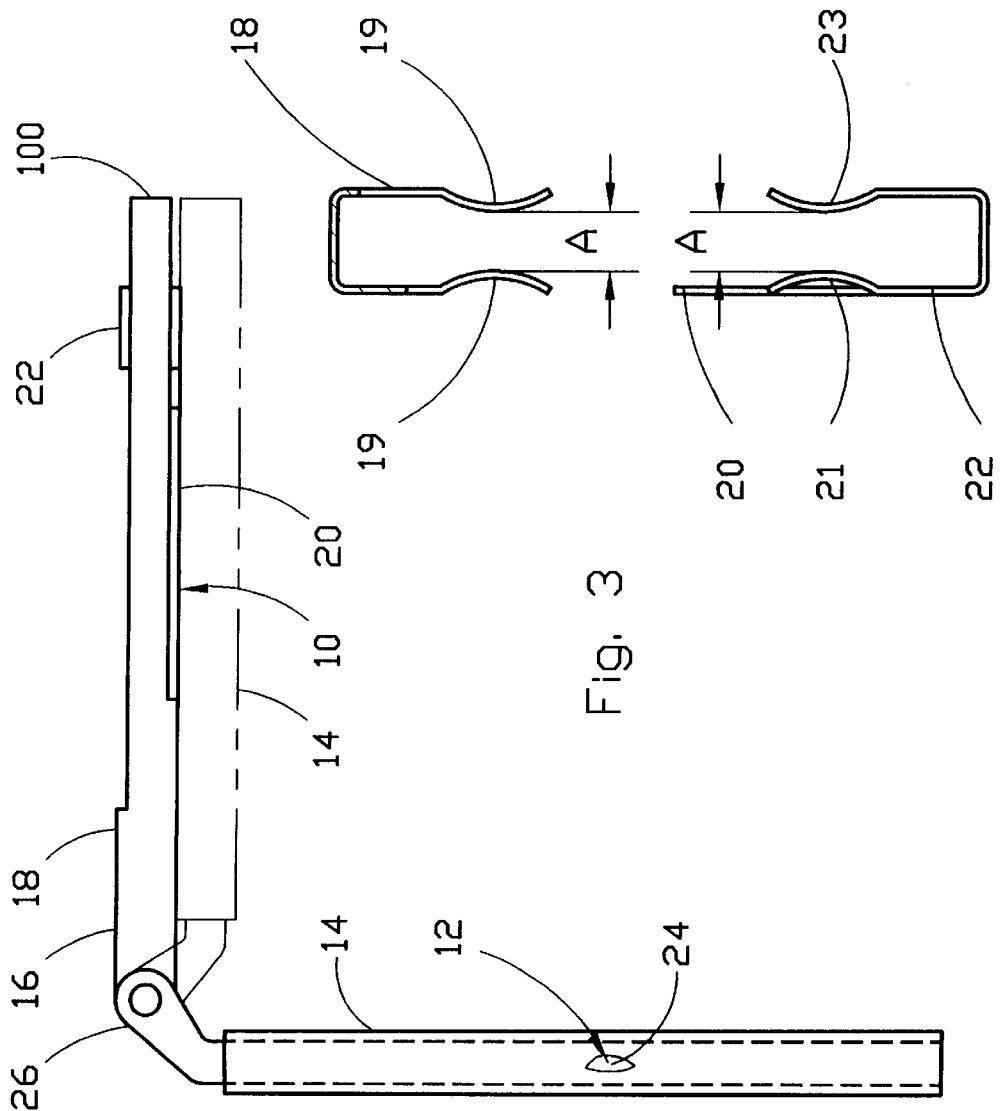

CLIP-ON SIDE SUN VISOR

BACKGROUND OF THE INVENTION

1. Field of the Invention

The present invention relates generally to sun visors and more specifically to a clip-on side sun visor which allows a side sun visor to be quickly attached to an existing front sun visor.

2. Discussion of the Prior Art

A problem frequently encountered while driving a vehicle is the need for a sun visor to protect the driver from the sun. Every vehicle has a sun visor which may be rotated to the side, but it is many times more comfortable to have a side sun visor which blocks the sun's rays on both the front and side windows of a vehicle. There are several patents which address the use of an attachable sun visor. Some of these patents are U.S. Pat. No. 2,823,950 to Harris, U.S. Pat. No. 4,950,021 to Vandagriff, U.S. Pat. No. 5,306,065 to Ades, and U.S. Pat. No. 5,580,117 to Goclowski. However, none of these patents disclose a side sun visor with top and bottom clips that are attached to the front sun visor.

Accordingly, there is a clearly felt need in the art for a clip-on side sun visor which allows thereof to be quickly attached to a front sun visor and has top and bottom mounting clips for secure attachment to thereof.

SUMMARY OF THE INVENTION

The primary objective of the present invention is to provide a clip-on side sun visor which allows thereof to be quickly attached to a front sun visor and has top and bottom mounting clips for secure attachment to thereof.

According to the present invention, a clip-on side sun visor includes an attachment device, a support rod, and a side sun visor. A first end of the attachment device is pivotally attached to one end of the support rod. A downward facing clip is disposed at the first end of the attachment device. An upward facing clip is disposed at a second end of the attachment device. Preferably, the length of the attachment device is substantial the length of the front sun visor. The first end of the attachment device is disposed at a top of the front sun visor and the second end of the attachment device is disposed at a bottom of the front sun visor. The side sun visor preferably pivots relative to the support rod. The support rod preferably extends the length of the side sun visor.

Accordingly, it is an object of the present invention to provide a clip-on side sun visor which allows thereof to be quickly attached to a front sun visor.

Finally, it is another object of the present invention to provide a clip-on side sun visor which may be securely attached to a front sun visor.

These and additional objects, advantages, features and benefits of the present invention will become apparent from the following specification.

BRIEF DESCRIPTION OF THE DRAWINGS

FIG. 3 is a top view of the clip-on side sun visor attached to a front sun visor of a vehicle in accordance with the present invention.

FIG. 4 is an end view and partial cross-sectional view of attachment clips of the clip-on sun visor in accordance with the present invention.

DETAILED DESCRIPTION OF THE PREFERRED EMBODIMENTS

Figure 1:
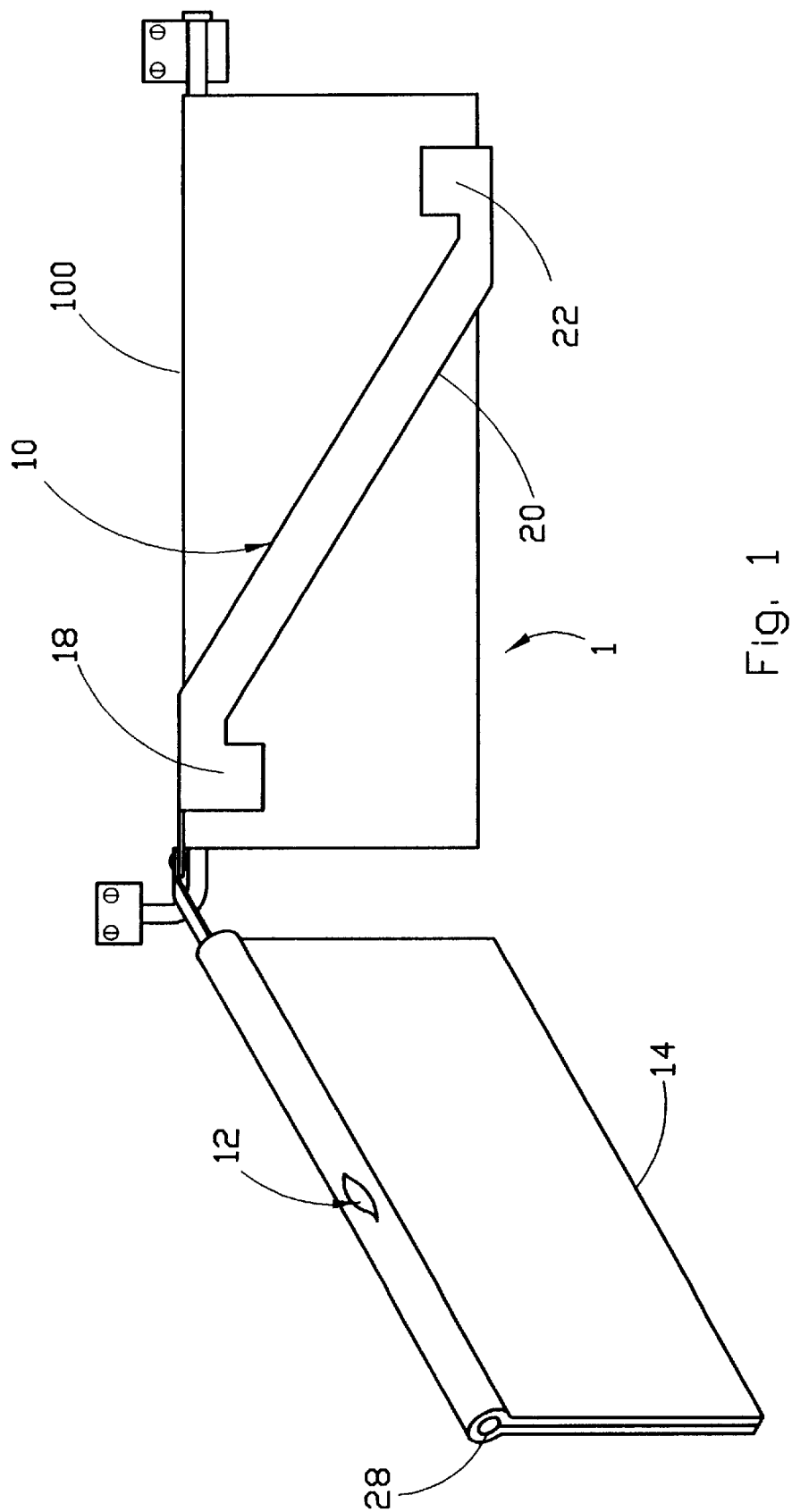
FIG. 1 is a perspective view of a clip-on side sun visor attached to a front sun visor of a vehicle in accordance with the present invention.

With reference now to the drawings, and particularly to FIG. 1, there is shown a perspective view of a clip-on side sun visor 1. With reference to FIG. 3, the clip-on side sun visor 1 includes an attachment device 10, a support rod 12, and a side sun visor 14. The clip-on side sun visor 1 is attached to a front sun visor 100 of a vehicle. The attachment device 10 includes a pivot tab 16, a downward facing clip 18, an upward facing clip 22, and an angled plate 20. The pivot tab 16 is disposed at a first end of the attachment device 10. The downward facing clip 18 is disposed adjacent the pivot tab 16. The upward facing clip 22 is disposed at a second end of the attachment device 10. One end of the angled plate 20 extends outward and downward from the downward facing clip 18. The other end of the angled plate 20 extends outward and upward from the upward facing clip 22. The pivot tab 16, downward facing clip 16, upward facing clip 22, and angled plate 20 are preferably formed of a single piece of material.

FIG. 4 shows an end and partial cross-sectional view of the downward facing clip 18 and the upward facing clip 22. The downward facing clip 18 has at least one inward facing offset leg 19. The upward facing clip 22 has at least one inward facing offset leg 23. The dimension "A" is sized to be smaller than the thickness of the front sun visor 100. The downward facing clip 18 acts as the pivot point for the weight of the side sun visor 14. The upward facing clip 22 prevents the side sun visor 14 from falling off the front sun visor 100. Other designs of attachable side sun visors which have two clips on the top may fall off without additional support. The attachment device 10 is preferably fabricated from spring steel, but could be fabricated from other resilient materials.

The support rod 12 includes a rod portion 24 and an offset pivot tab 26. The rod portion 24 and offset pivot tab 26 are preferably a single piece of material. Preferably, the length of the rod portion is substantial the length of the side sun visor 14. The offset pivot tab 26 is pivotally attached to the pivot tab 16 of the attachment device 10 with a rivet, screw, or any other suitable fastener. The offset pivot tab 26 has an offset pivot to allow the side sun visor 14 to be folded parallel against the front sun visor 100 as shown in FIG. 3. The side sun visor 14 is preferably the size of the front sun visor 100. The pivot tab 16 and the offset pivot tab 26 may be replaced with a ball and socket joint. The support rod 12 would be pivotally connected to the attachment device 10 with the ball and socket joint. With a ball and socket joint the side sun visor 14 would not need to pivot relative to the support rod 12 to fold thereof upward.

Figure 2:
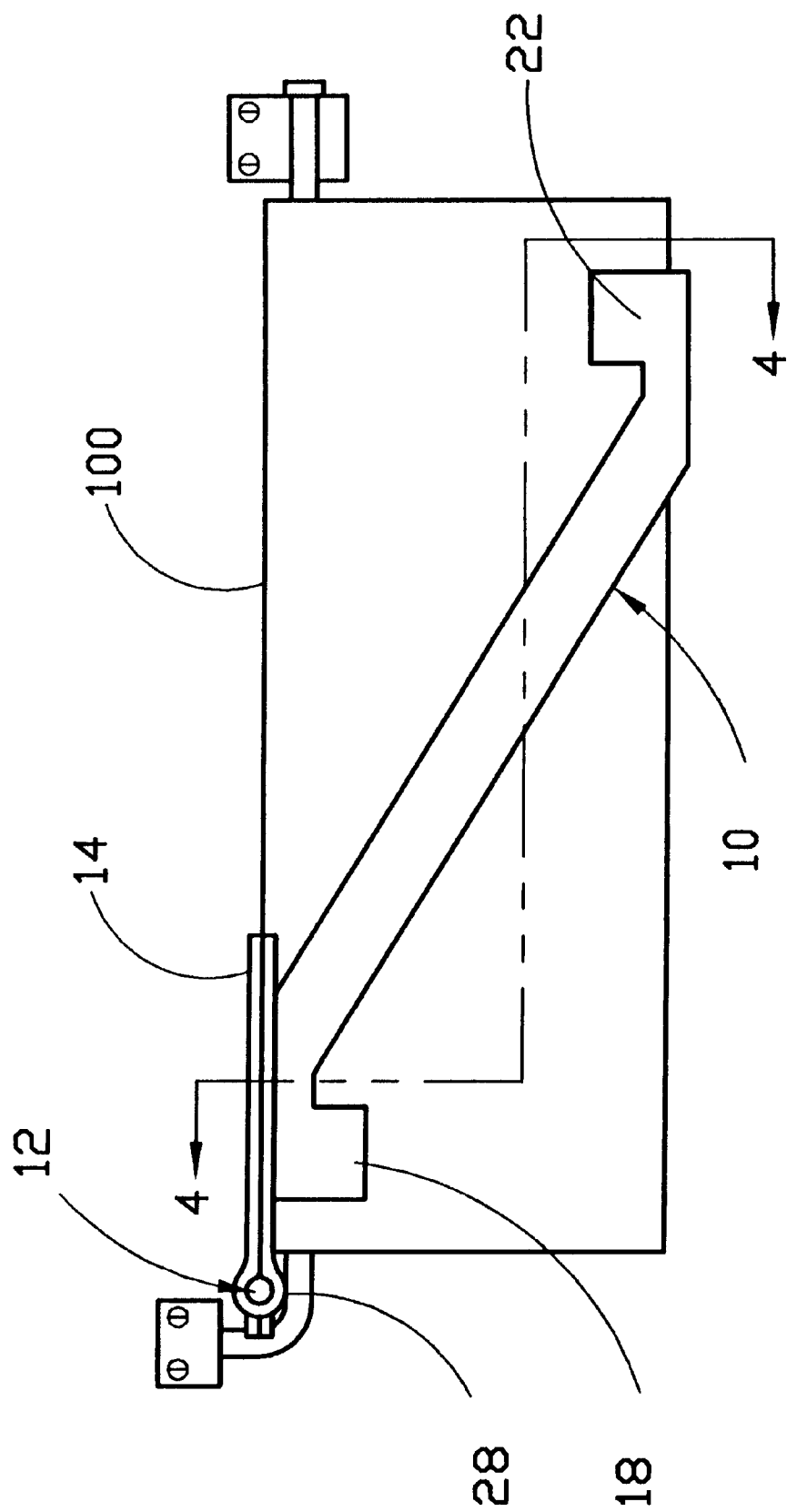
FIG. 2 is a front view of the clip-on side sun visor attached to a front sun visor of a vehicle with the side sun visor rotated upward in accordance with the present invention.

The side sun visor 14 is preferably fabricated from a stiff base material which is over-laid with a second fabric layer for cosmetic purposes. The side sun visor 14 could also be fabricated from a single piece of molded plastic, or from any single material, or combination of materials. The side sun visor 14 preferably has a bore 28 disposed through the length thereof. The bore 28 is sized to snugly fit over the rod portion 24 such that the side sun visor 14 may be rotated upward and remain in place when not in use as shown in FIG. 2. The bore 28 is preferably round but could be square, or any other shape. It is also possible to make a less expensive clip-on side sun visor which does not allow the side sun visor 14 to be rotated relative to the support rod 12. The side sun visor 14 would simply have a pivot tab extending from an end thereof.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. A clip-on side sun visor for attachment to a front sun visor of a vehicle comprising:

an attachment device having a downward facing clip on a first end and an upward facing clip on a second end thereof, said downward and upward facing clips being attached to the front sun visor of a vehicle; and a side sun visor being pivotally attached to said first end of said attachment device such that said side sun visor may be pivoted relative to the front sun visor.

2. The clip-on side sun visor for attachment to a front sun visor of a vehicle of claim 1, further comprising:

a support rod having a first end, said first end of said support rod being pivotally attached to said first end of said attachment device, said side sun visor having a bore formed through a length thereof, said bore being sized to snugly fit on said support rod such that said side sun visor may be rotated upward and remain in place.

3. The clip-on side sun visor for attachment to a front sun visor of a vehicle of claim 2, further comprising:

said attachment device including a pivot tab, an angled plate, said downward facing clip and said upward facing clip, said pivot tab being disposed at said first end, said downward facing clip being adjacent to said pivot tab, one end of said angled plate being attached to said down facing clip, the other end of said angled plate being attached to said upward facing clip.

4. The clip-on side sun visor for attachment to a front sun visor of a vehicle of claim 3, wherein:

said downward facing clip having a t l east one offset leg disposed at an end thereof, the width inside said downward facing clip being less than the thickness of the front sun visor; and said upward facing clip having at least one offset leg disposed at an end thereof, the width inside said upward facing clip being less than the thickness of the front sun visor.

5. The clip-on side sun visor for attachment to a front sun visor of a vehicle of claim 3, further comprising:

said support rod having a rod portion and an offset pivot tab, said offset pivot tab being pivotally attached to said pivot tab, said offset pivot tab allowing said side sun visor to be folded parallel against the front sun visor.

6. A clip-on side sun visor for attachment to a front sun visor of a vehicle comprising:

an attachment device having a downward facing clip on a first end and an upward facing clip on a second end thereof, said downward and upward facing clips being attached to the front sun visor of a vehicle;

a side sun visor; and a support rod having a first end, said first end of said support rod being pivotally attached to said first end of said attachment device, said side sun visor pivoting relative to said support rod.

7. The clip-on side sun visor for attachment to a front sun visor of a vehicle of claim 6, wherein:

said side sun visor having a bore formed through a length thereof, said bore being sized to snugly fit on said support rod such that said side sun visor may be rotated upward and remain in place.

8. The clip-on side sun visor for attachment to a front sun visor of a vehicle of claim 7, further comprising:

said attachment device including a pivot tab, an angled plate, said downward facing clip and said upward facing clip, said pivot tab being disposed at said first end, said downward facing clip being adjacent to said pivot tab, one end of said angled plate being attached to s aid down facing clip, the other end of said angled plate being attached to said upward facing clip.

9. The clip-on side sun visor for attachment to a front sun visor of a vehicle of claim 8, wherein:

said downward facing clip having at least one offset leg disposed at an end thereof, the width inside said downward facing clip being less than the thickness of the front sun visor; and said upward facing clip having at least one offset leg disposed at an end thereof, the width inside said upward facing clip being less than the thickness of the front sun visor.

10. The clip-on side sun visor for attachment to a front sun visor of a vehicle of claim 8, further comprising:

said support rod having a rod portion and an offset pivot tab, said offset pivot tab being pivotally attached to said pivot tab, said offset pivot tab allowing said side sun visor to be folded parallel against the front sun visor.

11. A clip-on side sun visor for attachment to a front sun visor of a vehicle comprising:

an attachment device having a downward facing clip on a first end and an upward facing clip on a second end thereof, said downward and upward facing clips being attached to the front sun visor of a vehicle;

a support rod having a first end, said first end of said support rod being pivotally attached to said first end of said attachment device; and a side sun visor having a bore formed through a length thereof, said bore being sized to snugly fit on said support rod such that said side sun visor may be rotated upward and remain in place.

12. The clip-on side-sun visor for attachment to a front sun visor of a vehicle of claim 11, wherein:

said attachment device including a pivot tab, an angled plate, said downward facing clip and said upward facing clip, said pivot tab being disposed at said first end, said downward facing clip being adjacent to said pivot tab, one end of said angled plate being attached to said down facing clip, the other end of said angled plate being attached to said upward facing clip.

13. The clip-on side sun visor for attachment to a front sun visor of a vehicle of claim 12, wherein:

said downward facing clip having at least one offset leg disposed at an end thereof, the width inside said downward facing clip being less than the thickness of the front sun visor; and said upward facing clip having at least one offset leg disposed at an end thereof, the width inside said upward facing clip being less than the thickness of the front sun visor.

14. The clip-on side sun visor for attachment to a front sun visor of a vehicle of claim 12, further comprising:

said support rod having a rod portion and an offset pivot tab, said offset pivot tab being pivotally attached to said pivot tab, said offset pivot tab allowing said side sun visor to be folded parallel against the front sun visor.

* * * * *